Patented July 8, 1930

1,770,367

UNITED STATES PATENT OFFICE

ROBERT SEAVER EDWARDS, OF MILTON, MASSACHUSETTS, ASSIGNOR TO RUMFORD CHEMICAL WORKS, OF PROVIDENCE, RHODE ISLAND, A CORPORATION OF RHODE ISLAND

METHOD OF PRODUCING PLASTER FROM BY-PRODUCT CALCIUM SULPHATE

No Drawing. Application filed January 19, 1929. Serial No. 333,753.

My present invention relates to certain improvements in the manufacture of plaster of Paris from by-product calcium sulphate containing an acid, such for example as that produced in the manufacture of phosphoric acid. In my previous Letters Patent No. 1,548,358, dated August 4, 1925, I disclosed a method of metathetical neutralization by which these heretofore waste by-products are converted into plaster of Paris of high quality and strength.

My present invention involves the further development of this invention in a carrying back of the inventive concept therein contained to a previous stage or step in the acid process by which I effect certain advantages and economies.

In certain methods of acid manufacture, as for example, in manufacture of phosphoric acid by the batch or intermittent process, the calcium sulphate is usually left as a deposit in the filters or tanks from which it had to be removed. The material due to its sludge condition was hard to remove and was awkward to handle unless put into more fluid form and in some instances it was merely flushed out and sluiced away.

My present invention contemplates the converting of this disadvantageous stage or state into a factor of advantage by utilizing it whenever necessary or possible, but in making of it a new step in or advancement of my metathetical neutralization described in the patent above referred to. In other words, I find that I am able to accomplish a very advantageous pre-neutralization by converting this ordinary sluicing into a phase of reaction in which neutralization in a highly ionized state is very inexpensively effected through the medium of the wash water and by the very agitation of the operation.

I therefore contemplate the use of a wash or sluicing water containing sodium salt as a neutralizing medium, as specified in my previous patent, but in a very dilute or highly ionized solution so as to lend a maximum mechanical manipulation as well as a chemical reaction. The sodium salt, which is present in relatively large amounts, reacts with the freely soluble phosphoric acid remaining in the sludge, forming sodium acid phosphate, which remains in solution in the presence of the excess of the sodium chloride in an ionized condition, according to the following chemical reaction:

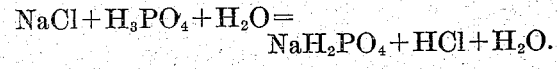

$$NaCl + H_3PO_4 + H_2O = NaH_2PO_4 + HCl + H_2O.$$

The calcium sulphate with these reaction products is then further neutralized with lime and the process carried through, as described in my previous patent, with the acidity completely neutralized and the reaction resultants in a form in which they are not only non-deleterious, but actually of advantage in stabilizing the plaster form from calcination of the gypsum so as to give the plaster great strength and make it of value for conversion into building products.

The use of sodium chloride as a neutralizing agent, either alone or combined with calcium salt, where readily available, materially reduces the cost of operation and, in some instances where sea water is available, it is actually possible, by the use of a large quantity of sea water, to make the ordinary saline content of this sea water suffice to give a complete preliminary neutralization of the phosphoric acid in ionized form.

What I therefore claim and desire to secure by Letters Patent is:—

1. In the method of producing plaster of Paris from acidulous by-product calcium sulphate from the manufacture of phosphoric acid or the like, leaving the calcium sulphate in a sludge body, that step which consists in making an initial metathetical neutralization of the sludge or filter residuum by sluicing it in a dilute solution of sodium chloride.

2. In the method of producing plaster of Paris from acidulous by-product calcium sulphate from the manufacture of phosphoric acid or the like, leaving the calcium sulphate in a sludge body, that step which consists in making an initial metathetical neutralization of free acid in the sludge or filter residuum by sluicing it in a dilute solution of sodium salt.

3. In the method of producing plaster of Paris from acidulous by-product calcium sulphate from the manufacture of phosphoric acid or the like in which it leaves the calcium sulphate in a filter sludge, that step which consists in sluicing the sludge by a dilute solution of sodium salt to produce an initial metathetical neutralization in an ionized state of the sludge while removing it from the filter.

4. In the method of producing plaster of Paris from acidulous by-product calcium sulphate from the manufacture of phosphoric acid or the like in which the calcium sulphate is left as a filter sludge, that step which consists in providing an initial metathetical neutralization of the sludge or filter residuum by sluicing it in a dilute solution of sea water.

5. That step in the method of handling filter sludges of acidulous by-product calcium sulphate from the manufacture of phosphoric acid or the like, which consists in sluicing out the sludge from the filter by a dilute solution of the metathetically neutralizing salt reactant with the acid to produce initial neutralization of the free acid of manufacture preparatory to a more complete metathesis to convert the reaction products and the excess salt to non-deleterious form in the ultimate plaster.

6. That step in the method of handling filter sludges of acidulous by-product calcium sulphate from the manufacture of phosphoric acid or the like, which consists in sluicing out the sludge from the filter by a dilute solution of a sodium salt reactant with the acid to produce initial metathetical neutralization preparatory to a more complete metathesis to convert the reaction products to a form non-deleterious to the ultimate plaster.

In testimony whereof I affix my signature.

ROBERT SEAVER EDWARDS.